United States Patent [19]

Chou

[11] Patent Number: 5,987,709
[45] Date of Patent: Nov. 23, 1999

[54] RE-ATTACHABLE SAFETY CONNECTOR

[76] Inventor: Tser-Wen Chou, 19464 Via Del Caballo, Yorba Linda, Calif. 92686

[21] Appl. No.: 08/940,801

[22] Filed: Sep. 30, 1997

[51] Int. Cl.[6] .......................................................... A44B 1/04
[52] U.S. Cl. ...................... 24/116 A; 24/115 F; 403/161; 403/DIG. 3
[58] Field of Search .............................. 24/116 A, 115 F, 24/602; 403/2, 339, 340, 161, 162, DIG. 3, 389, 391, 396, 385, 384; 248/548, 549

[56] References Cited

U.S. PATENT DOCUMENTS

| | | | |
|---|---|---|---|
| 1,151,813 | 8/1915 | Neufeld | 403/391 X |
| 1,420,790 | 6/1922 | Varney | 403/391 |
| 1,529,845 | 3/1925 | Moeller | 403/396 |
| 2,452,406 | 10/1948 | Volkery et al. | 403/391 |
| 2,712,167 | 7/1955 | Blanchard | 403/391 X |
| 2,878,080 | 3/1959 | Brutosky | 403/344 |
| 2,963,679 | 12/1960 | Jugle | 403/391 X |
| 3,604,687 | 9/1971 | Moore | 403/391 X |
| 4,273,465 | 6/1981 | Schoen | 403/389 X |
| 4,787,514 | 11/1988 | Pantev | 403/400 |
| 5,060,961 | 10/1991 | Bontrager | 403/389 X |
| 5,120,152 | 6/1992 | Gueli | 24/602 |
| 5,518,056 | 5/1996 | Voss | 24/115 F |
| 5,769,556 | 6/1998 | Colley | 403/391 X |
| 5,794,897 | 8/1998 | Jobin et al. | 403/391 X |

FOREIGN PATENT DOCUMENTS

| | | | |
|---|---|---|---|
| 708248 | 4/1931 | France | 403/391 |
| 1567165 | 5/1980 | United Kingdom | 403/391 |

*Primary Examiner*—Lynne H. Browne
*Assistant Examiner*—David E. Bochna
*Attorney, Agent, or Firm*—Curtis L. Harrington

[57] ABSTRACT

A re-attachable safety connector may be a single unit or may have a number of components working together as one unit. In the embodiments that have multiple components, connection of the components together may be accomplished by use of a series of pins inserted into a plurality of through bores in the body of the components at the mid-portions, as illustrated herein. Depending on the materials used to manufacture each of the elements of a given embodiment, the pin series may be sheared in half in order to provide for a safety release, or the properties of molded plastic as flexible may be relied upon in order to accomplish a safety release. Second through fourth embodiments are capsule shaped and provide for re-attachment of the chain.

4 Claims, 12 Drawing Sheets

Fig. 20

RE-ATTACHABLE SAFETY CONNECTOR

FIELD OF THE INVENTION

The present invention relates to the field of pull chain connectors, and more specifically to a re-attachable safety connector which may be used with a pull chain in order to decrease the likelihood of hanging or strangulation which may occur should the pull chain be within reach of a small child who might inadvertently become tangled with the cord.

BACKGROUND OF THE INVENTION

Several kinds of conventional connectors for use with ball-and-link type pull chains are commercially available for the purpose of coupling segments of pull chain together.

One of the more common conventional pull chain connectors is a metal, capsule-shaped connector which has a first large opening on a first side and a continuous slot which travels the length of the side opposite the first side and includes each end of the capsule. The continuous slot has a first small generally circular opening at its first end, a large generally circular opening at its mid-portion directly opposite the first large circular opening on the first side, and a second small generally circular opening at its second end. The two portions of the continuous slot which flank the large circular opening are just wide enough to accommodate a link of a pull chain. This conventional connector accommodates two balls, one from each of two pull chain segments to be connected. A first ball from a first segment of pull chain is inserted into the large generally circular opening of the continuous slot, and the pull chain link adjacent that ball is snapped through the narrow portion of the continuous slot so that the first ball rests in the end of the conventional connector and the pull chain link extends through the first small generally circular opening. A second ball from a second segment of pull chain is inserted into the opposite end of the conventional connector in the same way, so that the second segment of pull chain extends through the second small generally circular opening. Once the pull chain links are snapped into the narrow portions of the continuous slot, the pull chain links are essentially locked into position until they are manually removed from that position in the same way they were inserted. Tension applied to the pull chain does not in any way affect the connection between the pull chain segments established by the conventional connector.

Another of the conventional connectors is a lidded, box-like connector which has indentations at each end of the bottom portion of the box for accommodating a ball from each of two segments to be connected, and has slotted openings at each end of the box for accommodating the pull chain links leading out of the box, once the balls are placed inside the indentations. The balls are placed into the indentations and the lid of the box is snapped shut in order to retain the balls and link the segments of pull chain together securely. Like the first conventional connector, the security of the connection established with use of conventional connector is also largely undisturbed by increased tension on a pull chain.

Both of the aforementioned conventional connectors are extremely effective for connecting pull chain segments; however, neither possesses safety features which might prevent accidental injury. That these conventional connectors so reliably fix linked pull chain segments to one another disqualifies them as safety connectors.

A third conventional connector is available which is a cylinder designed to slide snugly over a second, smaller cylinder. The smaller cylinder has a depression at each of its ends for accommodating a pull chain ball from each of two segments of pull chain. Once the balls are situated in the depressions, the smaller cylinder is inserted inside the larger cylinder to secure the connection of the pull chain segments. Although the tubes are easily uncoupled from one another in a normal setting, they do require that a user grasp one of the pull chains with one hand while grasping the larger cylinder with the other hand. A user must only uncouple the components of the conventional connector by pulling the larger cylinder away from the smaller cylinder. Therefore, an entangled child would need to be able not only to locate the conventional connector while entangled, but to disassemble it using both hands in order to prevent himself/herself from further injury. A child may, however suffer some form of injury as a result of his/her entanglement even if he/she is able to disconnect the conventional connector, depending on the amount of time it takes the child to find and disassemble the components. A worse scenario, of course, is that of a child who may be unable either to locate or to disassemble the components of the conventional connector; it is for that reason that this conventional connector cannot be considered a safety connector.

Use of a conventional connector with a pull chain in a home or other environment where children have access to the pull chain could prove hazardous or even deadly. Historically, children have become tangled primarily about the head and neck with pull chains during the course of play. Unable to free themselves or even call for help in cases where their small airways might be compromised from strangulation, many children have suffered extreme injury and sometimes death as a result of their entanglement in pull chains. In the best case, a child may still suffer mild to moderate injury of an extremity which has become caught in the pull chain in the act of running or jumping while playing with the pull chain.

What is therefore needed is a re-attachable safety connector for use in linking segments of pull chains which will, with increased tension beyond a reasonable amount necessary to normally operate a pull chain, and without extra effort on the part of the operator or on the part of a child who becomes entangled therein, release at least one segment of pull chain, and thereby minimize the potential for injury or hanging.

SUMMARY OF THE INVENTION

The re-attachable safety connector of the present invention is designed for use with pull chains which have a succession of beads or balls connected to one another by links of cord or metal. The re-attachable safety connector of the present invention has multiple embodiments, the first of which is an assembly of components connected in scissor-fashion by a series of pins, including a central pivot pin and two holding pins, such that each end of the re-attachable safety connector will grasp and hold a ball from a segment of pull chain. A second embodiment of the re-attachable safety connector of the present invention is similar to the aforementioned embodiment except for the addition of a shear plate which aids in shearing the two holding pins in half when undue tension is exerted on the pull chain. Another embodiment of the re-attachable safety connector of the present invention has a capsular body with multiple openings on each side for accepting a ball from a pull chain segment. A third embodiment is similar to the capsular embodiment except that it has a square cross-section. A fourth embodiment is similar to the capsular embodiment except that insertion of a ball from a pull chain is accomplished by forcing the ball into the end of the capsule. The re-attachable safety connector of the present invention may be constructed of any number of combinations of plastic, steel, soft metal, or equivalents. Embodiments with multiple components fastened together with a series of pins may have pins and components constructed from different materials. Single unit embodiments of the present invention are preferably constructed of plastic or polypropylene. All embodiments of the re-attachable safety connector of the present invention have safety as their central feature, in that all embodiments will release a pull chain ball if more tension than necessary to perform a normal function of the pull chain, such as opening or closing a set of blinds, is applied.

BRIEF DESCRIPTION OF THE DRAWINGS

The invention, its configuration, and its construction will be further depicted in the following detailed description, taken in conjunction with the accompanying drawings in which.

DETAILED DESCRIPTION OF THE PREFERRED EMBODIMENT

Figures 1, 2:
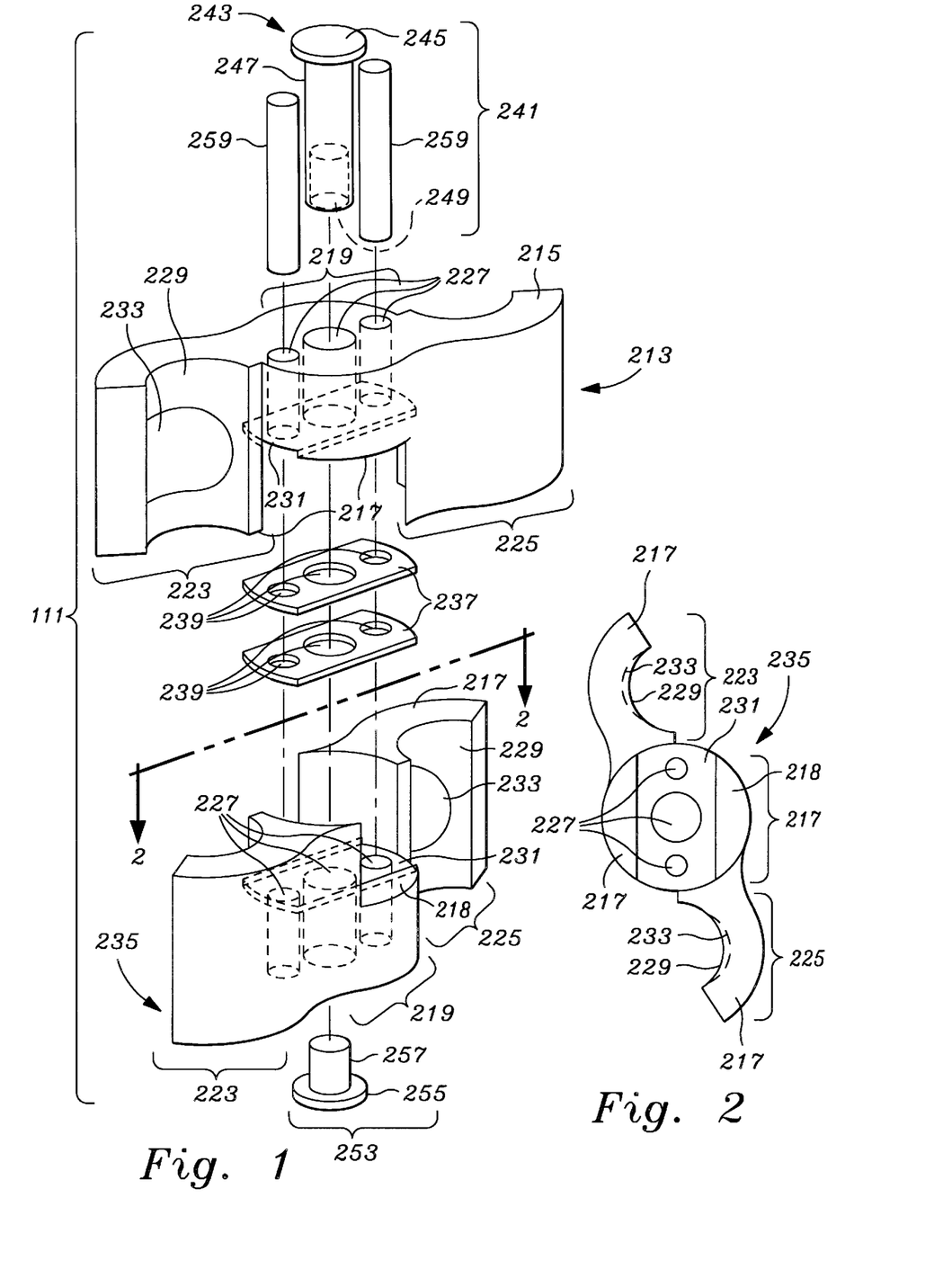
FIG. 1 is an exploded view of a first embodiment of the re-attachable safety connector of the present invention including a set of shear plates.
FIG. 2 is a view along line 2—2 of FIG. 2 which illustrates biplanar surfaces of one of the components of the second embodiment of the re-attachable safety connector of the present invention and further illustrates a recess for accommodating a shear plate.

FIG. 1 is an exploded view of a first embodiment of the re-attachable safety connector shown as connector 211 of the present invention having a first component 213 with a first, planar surface 215 and biplanar surfaces 217 & 218. First component has a middle portion 219, a first, curved end portion 223 which extends generally away from the middle portion 219 in a first direction, and a second, curved end portion 225 which extends generally away from the middle portion 219 in a second direction opposite the first, curved end portion 223. The middle portion 219 is about one-half the height of each of the first and second curved end portions 223 and 225, and is oriented flush to one side between the first curved end portion 223 and second curved end portion 225 to form the first planar surface 215 of the first component 213, and at the opposite side supports biplanar surface 218.

FIG. 1 illustrates the middle portion 219 as having a series of through-bores 227. Each of the first and second curved end portions 223 and 225 has an inner surface 229 with an indentation 233 in which a pull chain ball 145, 149 is seated during normal assembly and use. FIG. 1 shows a second component 235 which is identical to the first component 213 except that it has been rotated 180° relative to the illustration position of the first component 213.

FIG. 1 also illustrates a set of two shear plates 237 having a plurality of through bores 239 and positioned between first and second components 213 and 235 to provide reinforcement to more effectively concentrate the shearing force that occurs rotation between of the first and second components 213 and 235 when threshold tension is applied to a pull chain during use.

In normal assembly, these shear plates 237 are recessed into a depression 231 in the middle portion 219 of the first component 213 and the middle portion 219 of the second component 235 on their biplanar surfaces 218. Normally, the first component 213, its shear plate 237, second component 235 and its shear plate 237 are joined together from initial positions in which they are illustrated and are fastened by a series of pins 241 which include a first central pivot pin member 243 with a head 245, a shaft 247, and an open end portion 249; and, a second central pivot pin member 253 which has a head 255 and a shaft 257. The shaft 257 of the second central pivot pin member 253 fits into the open end portion 249 of the first central pivot pin member 243 when assembled to secure the connection of the components much like a rivet.

The series of pins 241 also includes a pair of holding pins 259 which flank the assembled pivot pin members 243 and 253. The first embodiment of the re-attachable safety connector 211 of the present invention preferably has first and second components 213 and 235 constructed from polypropylene, the set of two shear plates 237 constructed from steel, and the series of pins 241 constructed from either polypropylene or a metal which is soft relative to steel and which would be easily sheared in half with excessive tension applied to a pull chain and concentrated at the set of two shear plates 237.

Other material combinations can include construction from polypropylene, with series of pin set 241 constructed from polypropylene, or where central pivot pin member is constructed from steel, and where pair of holding pins 259 are made of either polypropylene or a very soft metal. Since polypropylene is flexible and soft relative to steel, any of these combinations will allow the components of the safety connector 211 to enable release of the pull chain (not yet illustrated—see FIG. 2). Additionally, first component 213 and second component 235 may be constructed from steel, with series of pins 241 constructed from polypropylene. The tension exerted on a pull chain will result in a concentration of force at the middle portions 219 of first and second components 213 and 235. Because the pair of holding pins 259 are constructed of a material which is softer than steel, they will be sheared in half with such a concentration of force, by the shear plates 237 allowing the ends of the re-attachable safety connector 211 to open and release a pull chain ball contained therein.

FIG. 2 is a view along line 2—2 of FIG. 1 which illustrates the biplanar surfaces 217 & 218 of the second component 235 of the second embodiment of the re-attachable safety connector 211 of the present invention. FIG. 1 illustrates the first, curved end portion 223 with inner surface 229 and indentation 233; second, curved end portion 225 with inner surface 229 and indentation 233; and, middle portion 219 with series of through bores 227.

FIG. 2 further illustrates a depression 231 on the biplanar surface 218 of the middle portion 219 of each of the first component 213 and second component 235. The set of shear plates 237 are recessed into these depressions 231 when the components of the re-attachable safety connector 211 are assembled.

Figure 3:
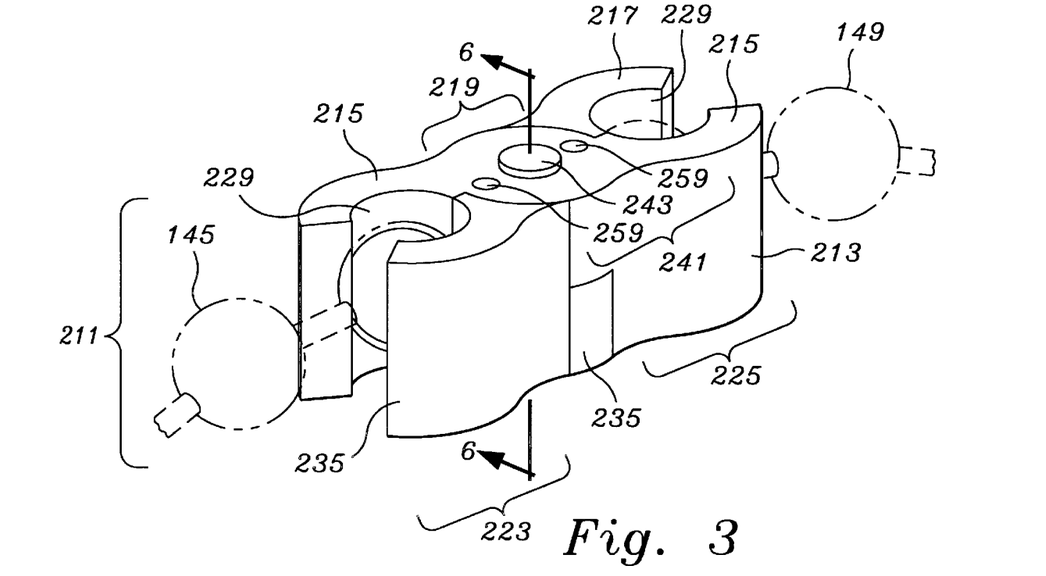
FIG. 3 is a perspective view of the first embodiment of the re-attachable safety connector of FIG. 1 shown as assembled and also illustrates a ball, in phantom, from a pull chain segment as inserted into each end of the re-attachable safety connector of the present invention.
Figure 5:
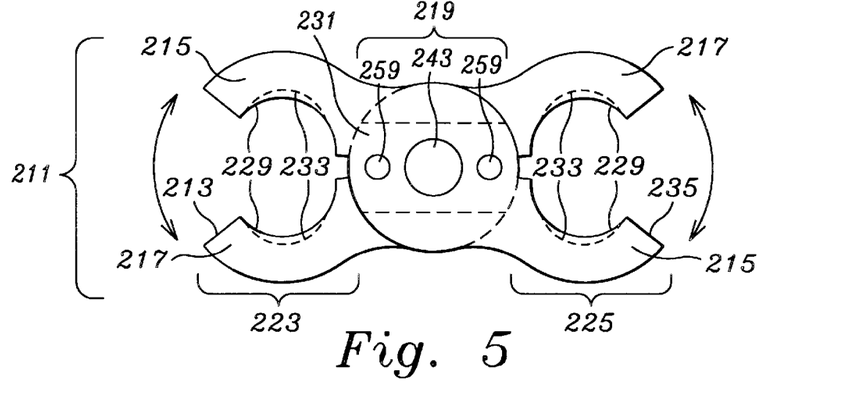
FIG. 5 is a top view of the second embodiment of the re-attachable safety connector of FIG. 4 which further illustrates each of the ends of the re-attachable safety connector as partially open for accepting or releasing a ball from a pull chain segment.

FIG. 3 is a left perspective view of the second embodiment of the re-attachable safety connector 211 of FIG. 5 as assembled. FIG. 3 illustrates first component 213 fitted onto second component 235, first and second components 213 and 235 fastened together in a scissors orientation by series of pins 241. FIG. 3 illustrates the head 245 of the first central pivot pin member 243 flanked by the pair of holding pins 259. First and second components 213 and 235 are arranged in scissors fashion so that each end of the assembled re-attachable safety connector 211 has the potential for grasping a pull chain ball 145 and 149. In FIG. 3, the first, planar surface 215 of first component 213, and the biplanar surface 217 of second component 235 are visible. FIG. 3 also illustrates, in phantom, a first ball 145 and 149.

Figure 4:
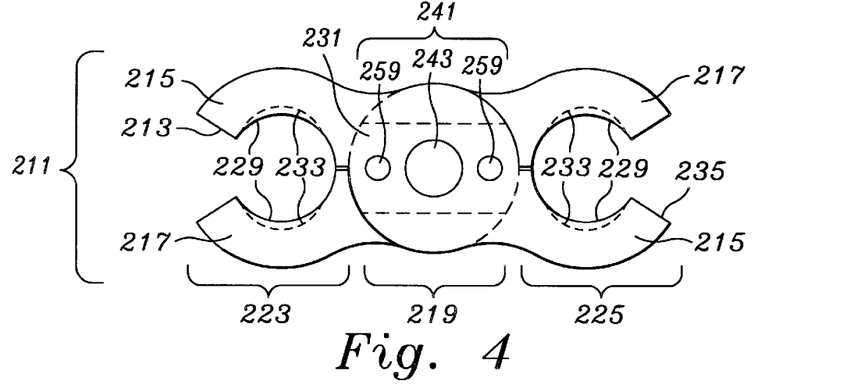
FIG. 4 is a top view of the first embodiment of the re-attachable safety connector of FIG. 3 which illustrates the position of the shear plates and the location of the indentations in which a pull chain ball would be seated during normal use.

FIG. 4 is a top view of the second embodiment of the re-attachable safety connector 211 of FIGS. 1–3 which illustrates the first planar surface 215 of the first component 213, and the surface 217 of the second component 235, and series of pins 241. FIG. 4 further illustrates, by dashed lines, the indentations 233 in each of first and second curved end portions 223 and 225 which, fastened together, form the grasping ends of the re-attachable safety connector 211 of the present invention. During normal use, a pull chain ball would be seated in a set of the indentations 233 (see FIG. 3). FIG. 4 also illustrates by dashed line the position of the set of two shear plates 237 (referring to FIG. 1) within the assembled re-attachable safety connector 211.

FIG. 5 is a top view of the first embodiment of the re-attachable safety connector 211 of FIG. 3 which further illustrates each end of the re-attachable safety connector 211 as partially opening to accept (or release) a pull chain ball 145, 149.

Figure 6:
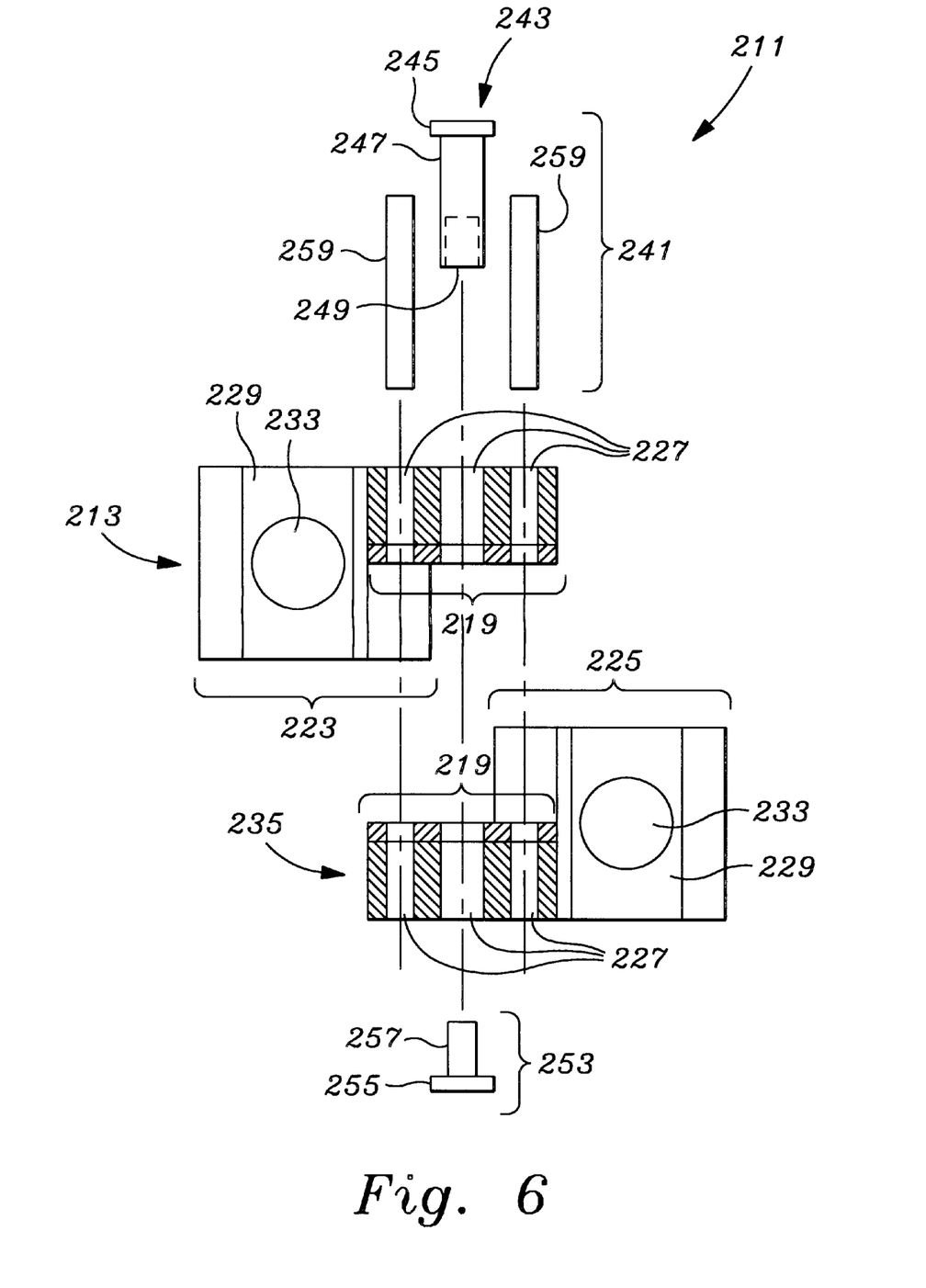
FIG. 6 is an exploded cross-sectional view of the re-attachable safety connector taken along line 6—6 of FIG. 3.
Figures 7, 8:
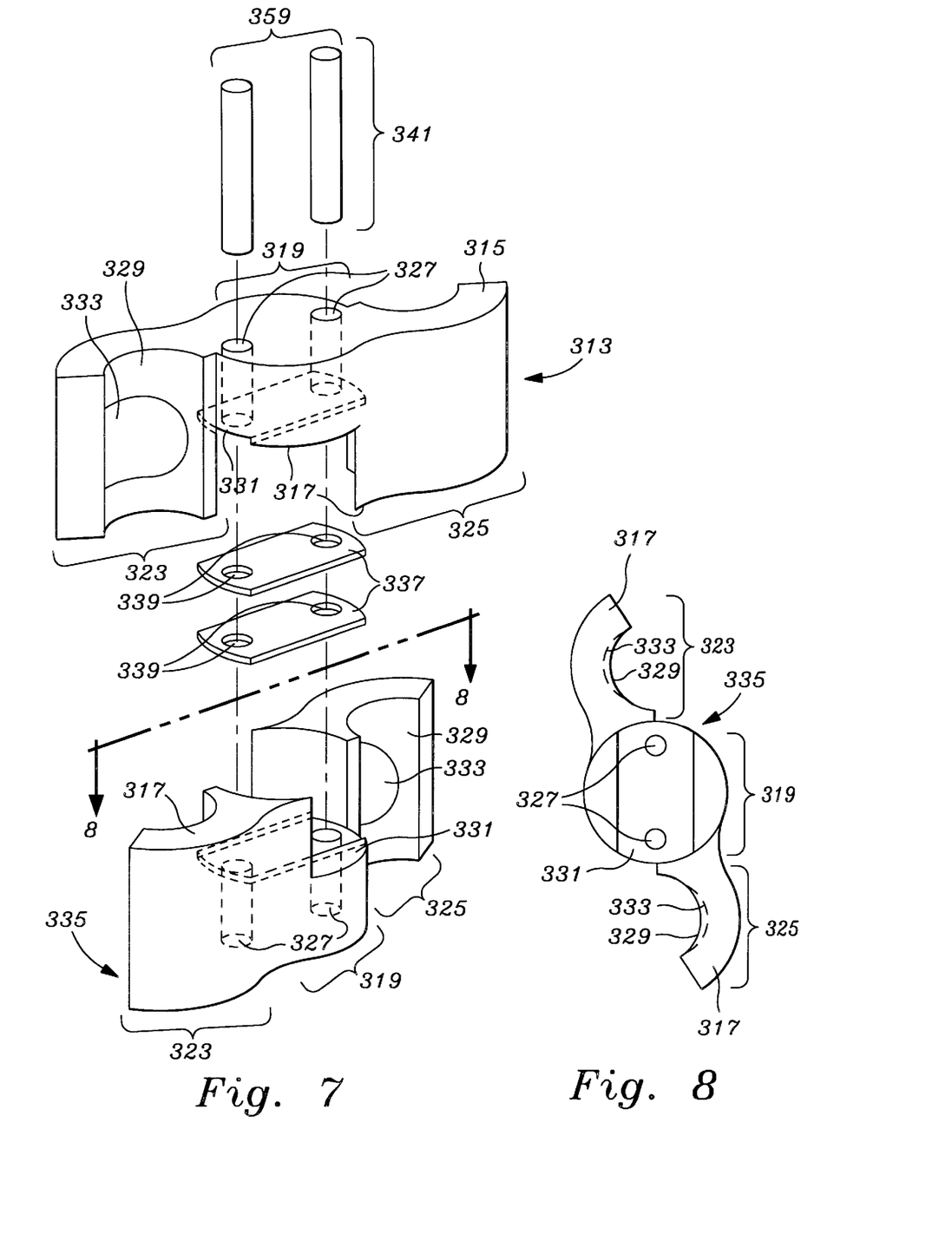
FIG. 7 is an exploded view of a second embodiment of the re-attachable safety connector of the present invention which is similar to the first embodiment of FIGS. 1–5 except that it lacks a central pivot pin.
FIG. 8 is a view along line 8—8 of FIG. 7 which illustrates the biplanar surfaces of side of one of the components of the second embodiment of the re-attachable safety connector of the present invention.
Figure 9:
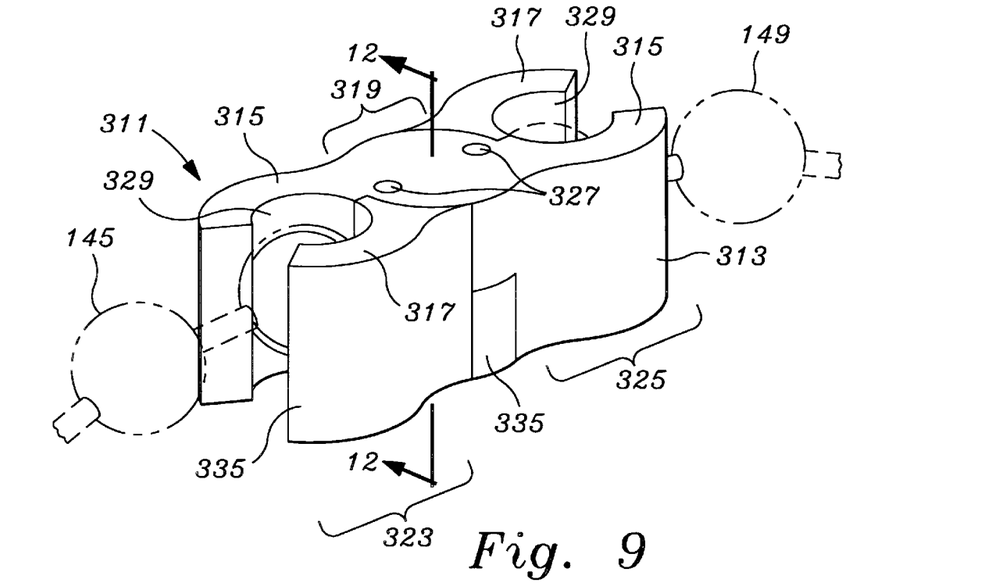
FIG. 9 is a left elevational view of the second embodiment of the re-attachable safety connector of the present invention as assembled, and also illustrates a ball, in phantom, from a pull chain segment as inserted into each end of the re-attachable safety connector of the present invention.
Figure 10:
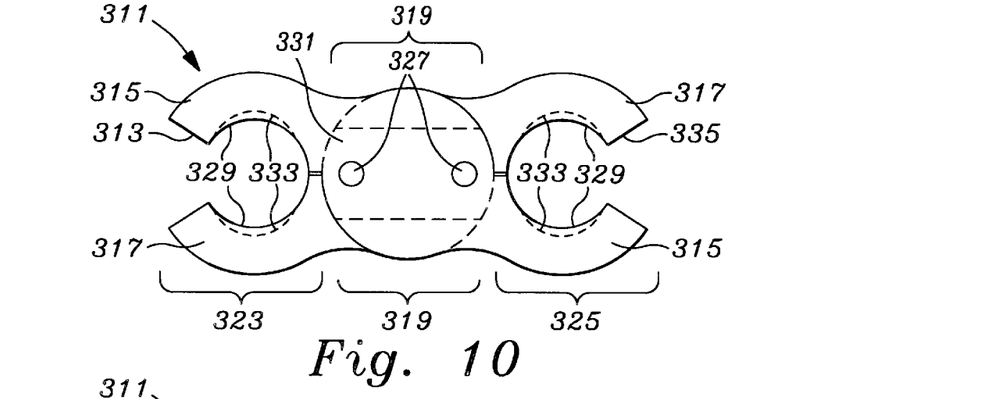
FIG. 10 is a top view of the second embodiment of the re-attachable safety connector of the present invention which illustrates the position of the shear plates and the location of the indentations in which a pull chain ball would be seated during normal use.
Figure 11:
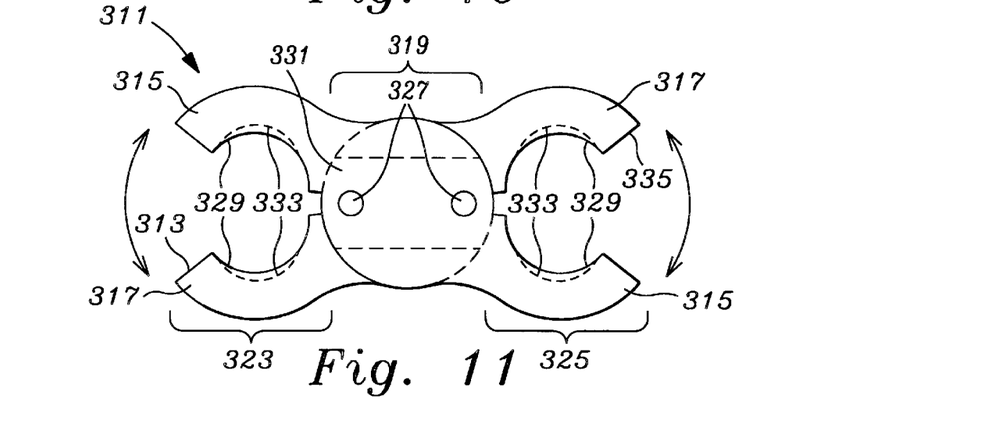
FIG. 11 is a top view of the second embodiment of the re-attachable safety connector of FIG. 10 which further illustrates each of the ends of the re-attachable safety connector as partially open for accepting or releasing a ball from a pull chain segment.

FIG. 6 is an exploded cross-sectional view of the second embodiment of the re-attachable safety connector 211 taken along line 6—6 of FIG. 3. FIG. 6 details series of pins 241 which comprise the first central pivot pin member 243 with head 245, shaft 247, and open end portion 249; pair of holding pins 259 flanking the first central pivot pin member 243; and, second central pivot pin member 253 with head 255 and shaft 257.

FIG. 6 illustrates the first curved end portion 223 of the first component 213 with inner surface 229 and indentation 233, and illustrates middle portion 219 of each of first and second components 213 and 235 with series of through bores 227. FIG. 6 illustrates the second curved end portion 225 of the second component 235 with inner surface 229 and indentation 233. Although the indentations 233 in each of the first and second curved end portions 223 and 225 are illustrated as being circular, they may be any of a variety of shapes that will effectively seat and prevent lateral movement of a pull chain ball between the grasping ends of the re-attachable safety connector 211 of the present invention.

Note that FIGS. 7–12 represent a second embodiment of the re-attachable safety connector, and that all elements in FIGS. 7–12 are identical to those of FIGS. 1–6, except that they lack the first and second central pivot pin members 243 and 253 and one of the plurality of through bores 227 of FIGS. 1–6, namely that which would accommodate the first and second central pivot pin members 243 and 253 if they were present in this third embodiment. FIGS. 7–12 are numbered to correspond with the numbering of FIGS. 1–6 with the exception of the first numeral in each series. The first numeral "2" in FIGS. 1–6 has been changed to "3" in FIGS. 7–12, and is representative of the second embodiment, of the re-attachable safety connector of the present invention. The assembly 311 uses the interfitting geometry of the parts, namely the outside of the middle portions 319 against the inner edges of the inner curved portion 323 and 325 which oppose the middle portion 319 of the other side.

Although the first three embodiments 111, 211, and 311 are illustrated as having set dimensions, any of the three embodiments 111, 211, and 311 of the re-attachable safety connector may be manufactured having increased thickness while maintaining the same general end-to-end length of the components for the purpose of increasing the amount of tension required to insert or remove a pull chain ball.

Reasons for varying the amount of tension required to insert or remove the pull chain ball would be based on the task that is to be accomplished with the pull chain. For example, little tension would be required for a pull chain used with a standard set of household blinds; greater tension would be required retain a pull chain ball within the re-attachable safety connector if the pull chain was for use with a larger, heavier, perhaps commercial set of blinds, or for use in any application in which high tension on a pull chain would normally be required.

Figure 13:
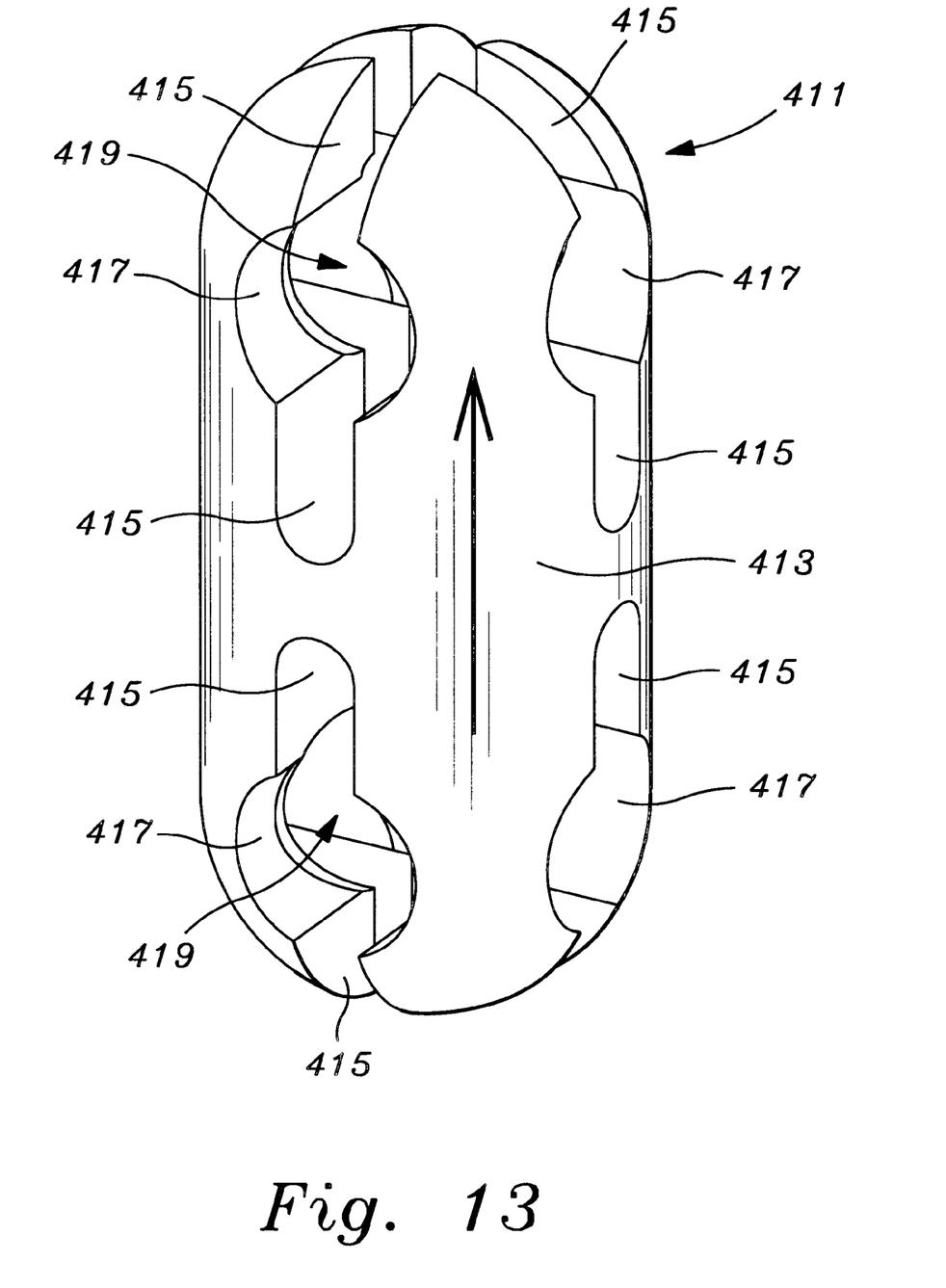
FIG. 13 is a perspective view of a capsular embodiment of the invention and having a capsule shape with four side openings adjacent each end, the release point coming at the tip of each end.

FIG. 13 is a left elevational view of a third embodiment of a re-attachable safety connector, namely safety connector 411 of the present invention having a capsular body 413 which is symmetrical with respect to its ends. Each of the ends of the capsular body 413 are identical and are divided into four sections by a pair of slotted openings 415, each one of which is perpendicular to an adjacent one of the other slotted openings 415. Each of the slotted openings 415 at each end extends down opposite sides of the capsular body 413 for approximately ⅔ of the entire length of the capsular body 413 before terminating on opposite sides of the capsular body 413. Each slotted opening 415 has width of about 1.5 mm, and each becomes wider by approximately 270% at two positions along its length to form circular openings 417. Each of the two circular openings 417 along a slotted opening 415 are on opposite sides of the capsular body 413, directly opposite one another, are approximately 4.0 millimeters in diameter, and are sized to accept a ball from a pull chain.

The size is important to the use of a plastic or polymeric safety connector. One of the standard ball sizes is about 4.6 millimeters. Shoving the 4.6 millimeter ball into the 4.0 millimeter circular opening 417 will cause slight deformation of the material of the connector 411. However, a ball chamber 419 is provided which, given the above dimensions, is about a 4.76 millimeters in diameter space. This provides for somewhat loose holding of the ball, such that the plastic of the body of the connector 411 will have an opportunity to un-deform, or to relax back to its original shape. This will provide consistent release pressure performance.

Medial to each of the four circular openings 417 at each end of the capsular body 413 is a ball chamber 419 (illustrated in dashed line format) in which a ball from a pull chain, such as 145 is seated during use. Connector 411 of the present invention is preferably constructed of a molded plastic such as polypropylene, which would lend to the simplicity and economy of mass manufacturing. Construction from a molded plastic also ensures that the re-attachable safety connector 411 will be flexible so that a ball from a pull chain may be easily inserted into one of the four circular openings 417 at each of the ends of the re-attachable safety connector 411 by applying pressure to the ball and forcing it into one of the four circular openings 417, and subsequently into the ball chamber 419.

The flexibility of molded plastic will also ensure that the re-attachable safety connector 411 of the present invention will easily release a ball from a pull chain should excessive tension be exerted on the pull chain, maintaining the safety feature that is the key concept in all embodiments of the present invention.

Figure 12:
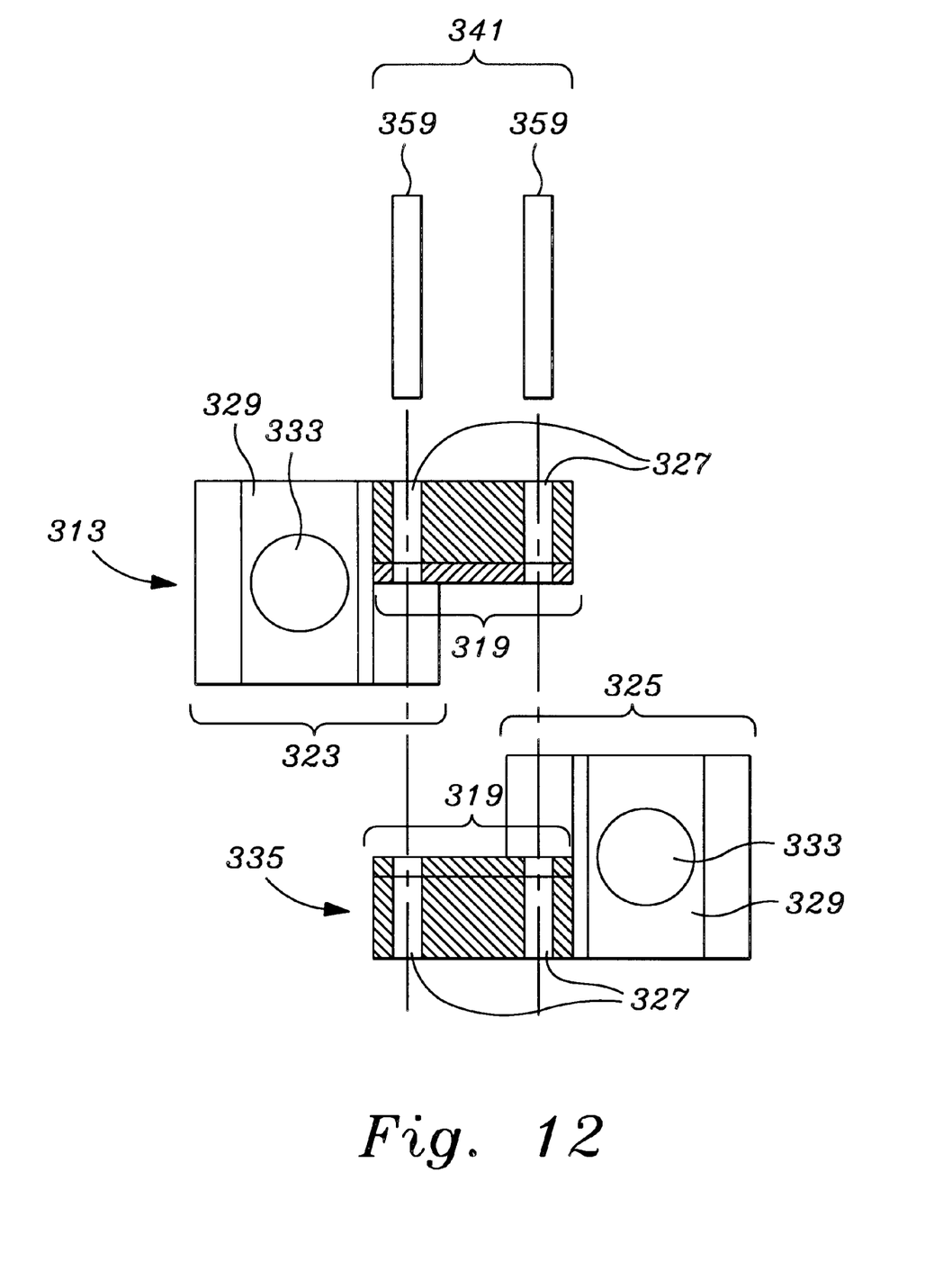
FIG. 12 is an exploded cross-sectional view of the re-attachable safety connector of the present invention taken along line 12—12 of FIG. 9 and illustrating a capsular shape, a circular cross-section, and multiple side openings into which a ball from a pull chain may be inserted.
Figure 14:
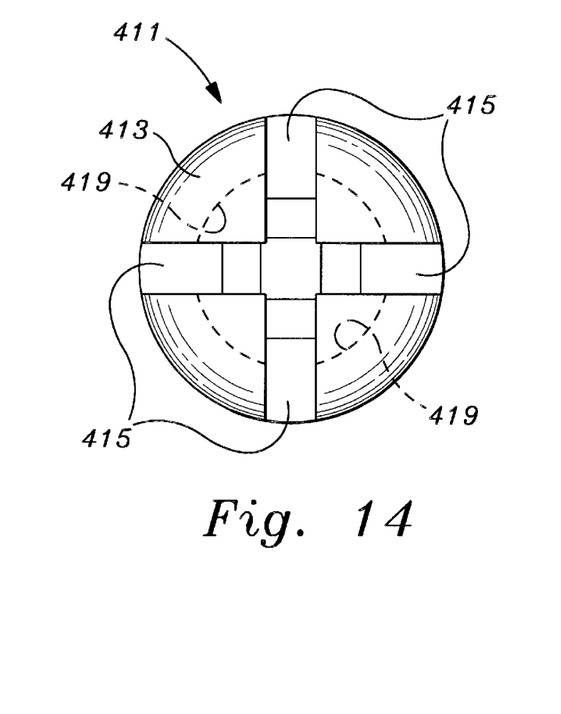
FIG. 14 is an end view of the embodiment of FIG. 13.

FIG. 14 is an end view of the third embodiment of the re-attachable safety connector 411 of FIG. 12 which illustrates the capsular body 413 twice bisected by the pair of slotted openings 415. FIG. 14 illustrates in dashed line format the position of the chamber 419 medial to the circular openings 417 (refer to FIG. 12). The circular cross-section of the fourth embodiment of the re-attachable safety connector 411 is evident in FIG. 14.

Figure 15:
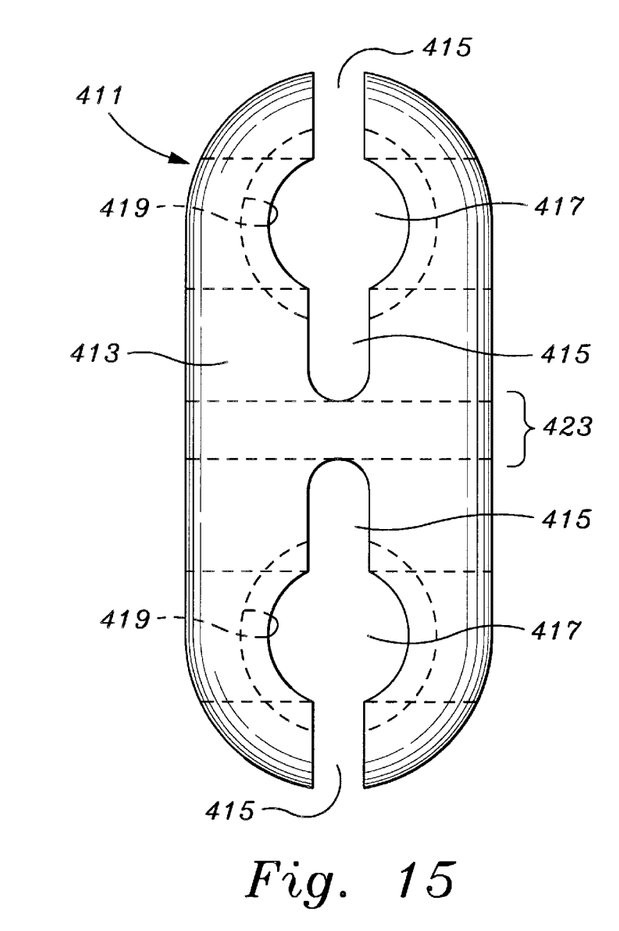
FIG. 15 is a side view of the embodiment shown in FIGS. 13 & 14.

FIG. 15 is a side view of the third embodiment of the re-attachable safety connector 411 of the present invention which illustrates the capsular body 413 with two slotted openings 415 which are in the same plane; FIG. 15 illustrates each slotted opening 415 with two circular openings 417 which are perfectly aligned and somewhat indistinguishable as two because of the viewing angle of FIG. 15. FIG. 15 also illustrates in dashed line format the position of the ball chamber 419 medial to the circular openings 417.

The section 423 of FIG. 15 illustrates how the strength of the connector 411 can be adjusted and controlled. Greater thickness of the section 423 will result in greater strength for the connector 411.

Figure 16:
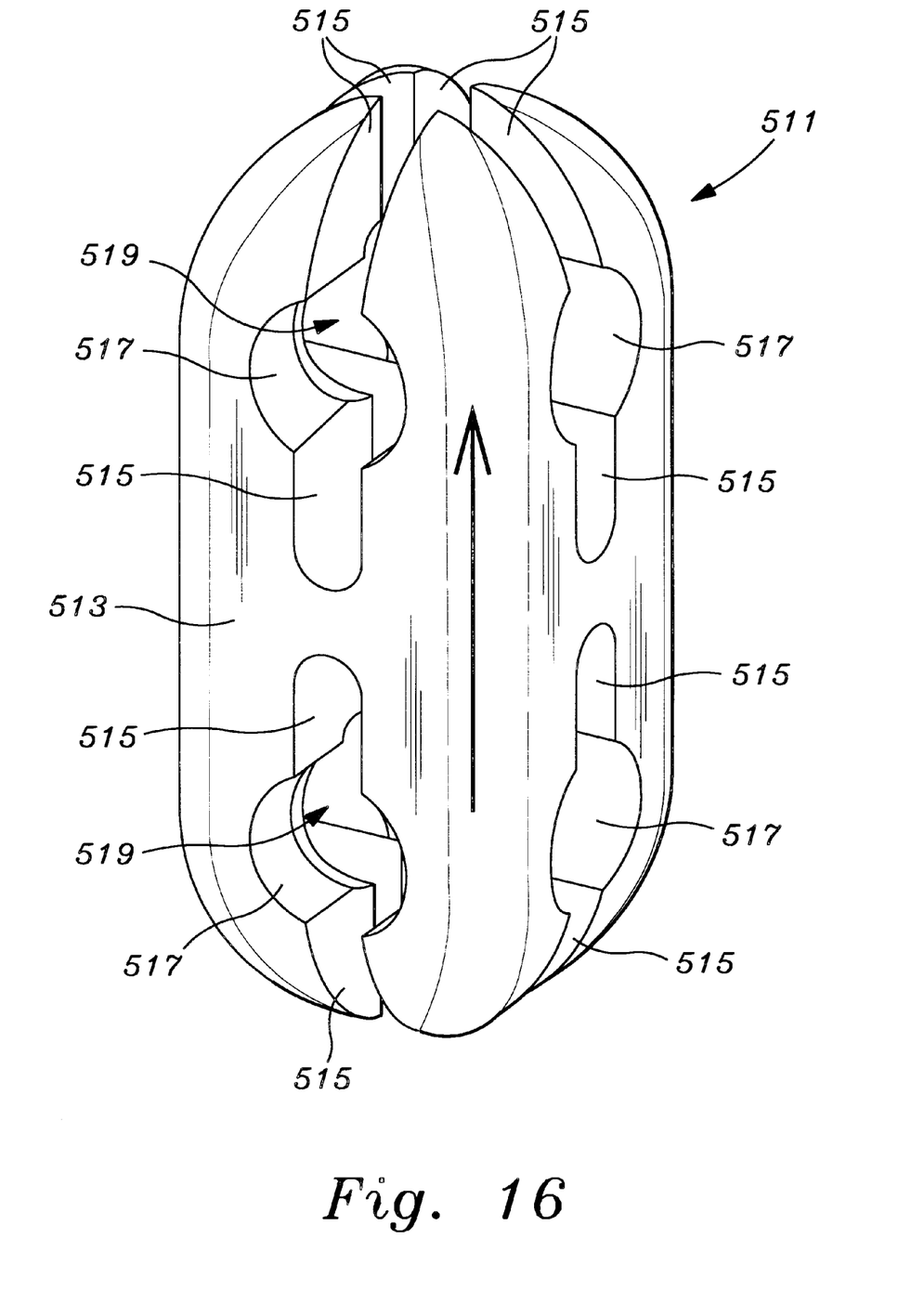
FIG. 16 illustrates an embodiment similar to the embodiment of FIGS. 13–15, but having a square cross-section.

FIG. 16 is a perspective view of a fourth embodiment of the invention as a re-attachable safety connector 511 of the present invention having a flat-sided capsular body 513 with a square cross-section; the fifth embodiment of the re-attachable safety connector 511 is symmetrical with respect to its ends. Each of the ends of the flat-sided capsular body 513 are identical and are divided into four sections by a pair of slotted openings 515, one of which is perpendicular to the other. Each of the slotted openings 515 at each end extends down opposite sides of the flat-sided capsular body 513 for approximately ⅔ of the entire length of the flat-sided capsular body 513 before terminating on opposite sides. Each slotted opening 515 has width of about 1.5 mm, and each becomes wider by approximately 270% at two positions along its length to form two circular openings 517. Each of the two circular openings 517 along a slotted opening 515 are on opposite sides of the flat-sided capsular body 513, directly opposite one another, are approximately 4.0 millimeters in diameter, and are sized to accept a ball 145 from a pull chain (not illustrated here). Medial to each of the four circular openings 517 at each end of the flat-sided capsular body 513 is a ball chamber 519 (illustrated in dashed line format) in which a ball from a pull chain (not illustrated) is seated during use. Connector 511 is also preferably constructed of a molded plastic such as polypropylene, which would lend to the simplicity and economy of mass manufacturing and would provide the flexibility needed to release a pull chain ball with increased tension on a pull chain (not illustrated).

The same dimensioning of the ball chamber 519 is achieved as was described for ball chamber 419. Of course, both the absolute magnitude of the ball 145, as well as that of the chamber 519 can change, but the loosely held ball 145 will still be the preferable method and structure. Similar to FIGS. 14 and 15, FIGS. 17 and 18 are side and end views of the connector 511.

Figure 17:
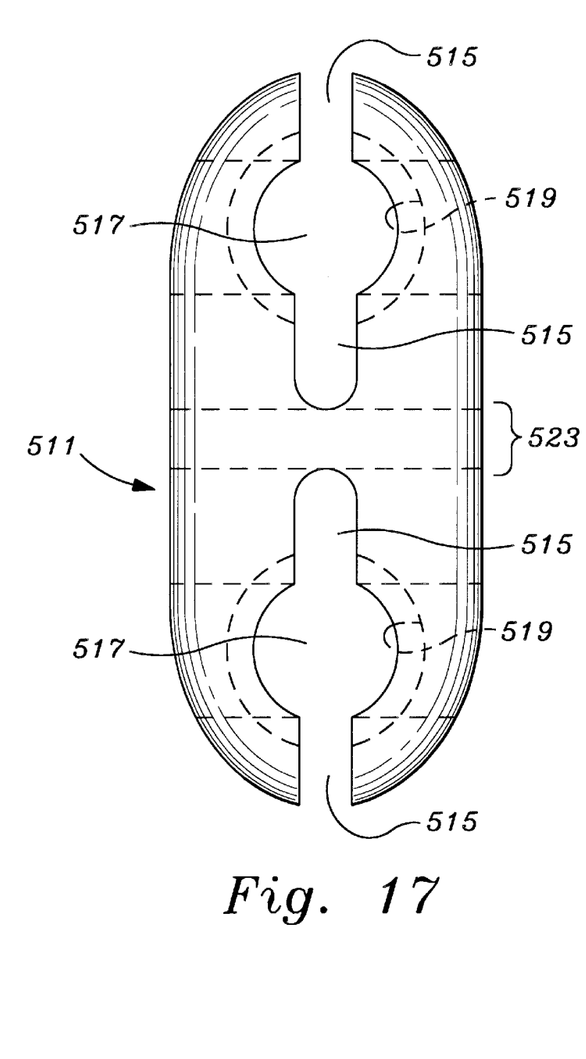
FIG. 17 is a side view of the embodiment of FIG. 16.
Figure 18:
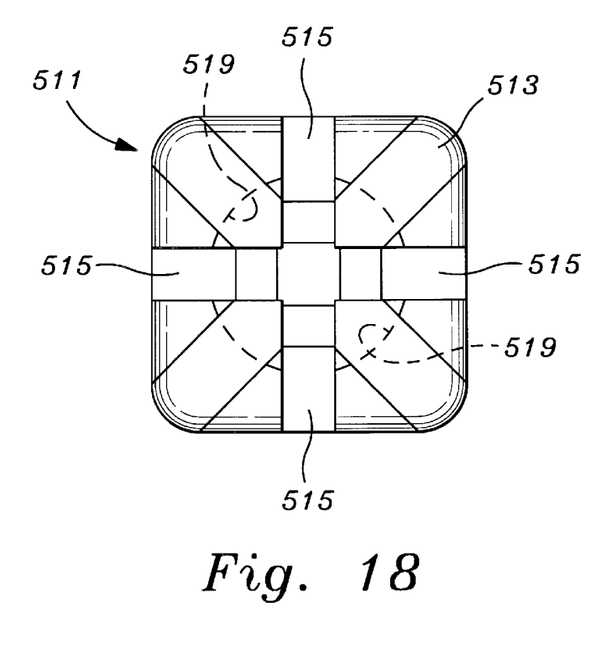
FIG. 18 is an end view of the embodiment shown in FIGS. 16 & 17.

Referring now to both FIGS. 15 and 17, each of the fourth and fifth embodiments 411 and 511 of the re-attachable safety connectors of the present invention have a defined midportion 423 and 523, respectively. The midportions 423 and 523 of these embodiments may be widened in order to increase the amount of tension needed to separate the ends of each of the re-attachable safety connectors 411 and 511. Reasons for doing so might include use of a re-attachable safety connector in an application in which a higher amount of tension would routinely be necessary to accomplish whatever task a pull chain might be employed to do. Each of the embodiments 411 and 511 may also be made smaller or larger in order to accommodate different sizes of pull chain balls. In the smaller version, the slotted openings 415 and 515 have a width from about 1.1 mm to about 1.4 millimeters; in the larger version, the slotted openings 415 and 515 have a width from about 1.5 to about 1.8 millimeter. The size of the circular openings 417 and 517 would need to be decreased or increased proportionally (approximately 270% of the width of the corresponding slotted openings 415 and 515) in order to accept a smaller or larger pull chain ball, the smaller of which would be approximately 4 mm in diameter, and the larger of which would be approximately 4.76 mm in diameter.

Figure 19:
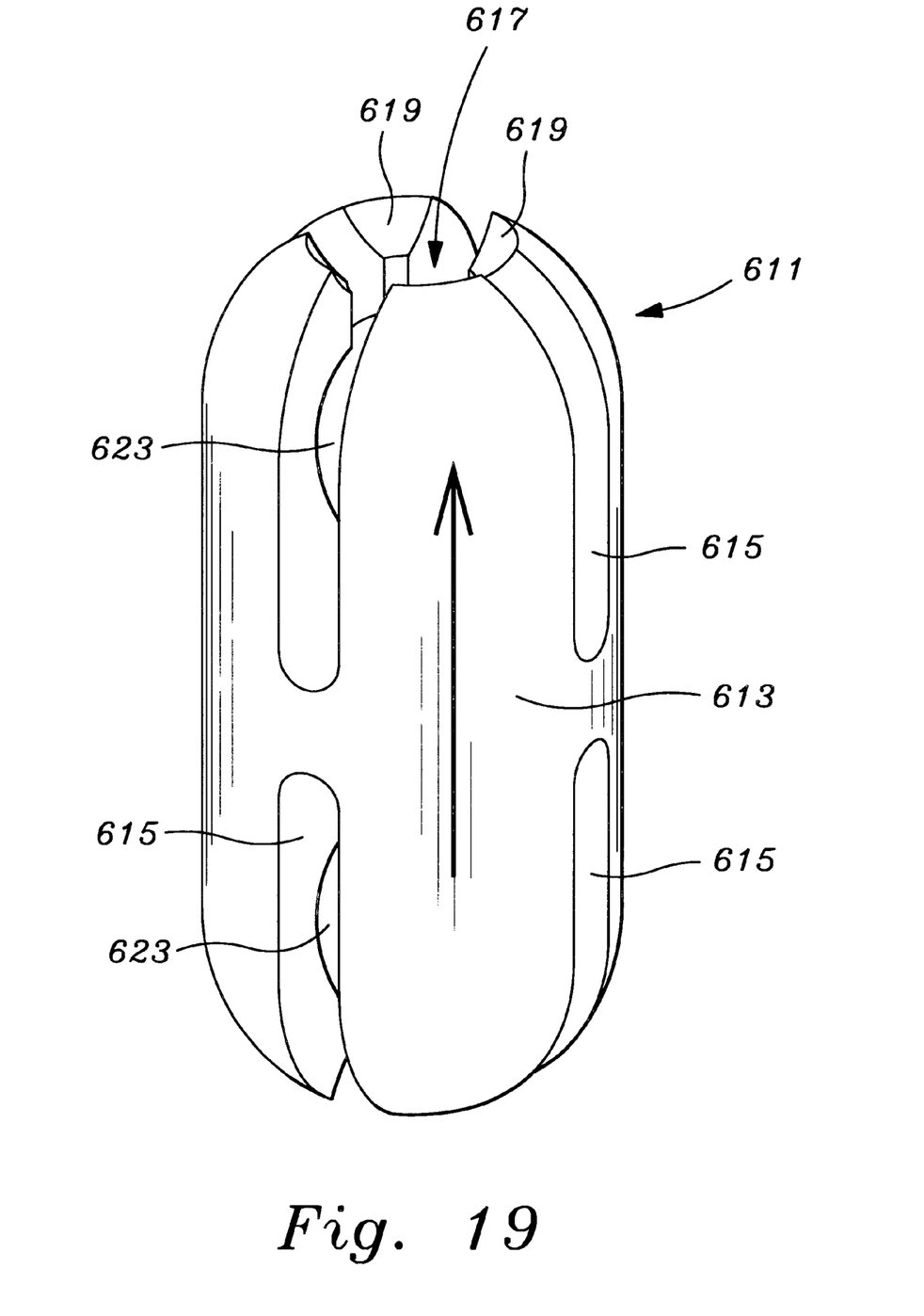
FIG. 19 illustrates an embodiment similar to the embodiment of FIGS. 16–18, but having provision for end insertion of the ball, rather than side insertion.

FIG. 19 is a fifth embodiment of the invention as a re-attachable safety connector 611 of the present invention which is similar in overall shape to the fourth embodiment of the re-attachable safety connector 411. Each of the ends of the capsular body 613 of the sixth embodiment of the re-attachable safety connector 611 are identical and are divided into four sections by a pair of slotted openings 615, one of which is perpendicular to the other. Each of the slotted openings 615 at each end of the capsular body 613 extends down opposite sides of the capsular body 613 for approximately ⅖ of the entire length of the capsular body 613 before terminating on opposite sides of the capsular body 613. Each slotted opening 615 has width of about 1.5 mm along the entire length of the slotted opening 615. Each end of the capsular body 611 has an end opening 617 in which a pull chain ball (not illustrated) may be seated prior to a user applying pressure to the ball to force it completely through the end opening 617. Each of the sections into which the end of the capsular body 613 is divided by the slotted openings 615 has an inwardly angled surface 619 which is slightly concave. Together, the four inwardly angled surfaces 619 form a cup-like holding area in which a pull chain ball may sit prior to being forced into an adjacent ball chamber 623. The sixth embodiment of the re-attachable safety connector 611 is also preferably constructed of a molded plastic such as polypropylene, lending to the flexibility that will result in the release of a pull chain ball with increased tension on a pull chain.

Figure 20:
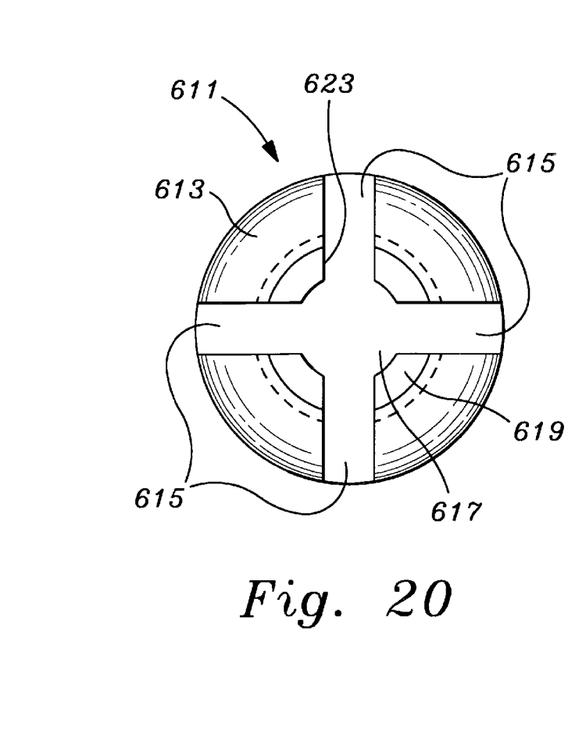
FIG. 20 is an end view of the embodiment of FIG. 19.

FIG. 20 is an end view of the fifth embodiment of the re-attachable safety connector 611 of FIG. 19 which illustrates the capsular body 613 twice bisected by the pair of slotted openings 615. FIG. 20 illustrates in dashed line format the position of the ball chamber 623 adjacent the end opening 617. The circular cross-section of the sixth embodiment of the re-attachable safety connector 611 is evident in FIG. 20.

Figure 21:
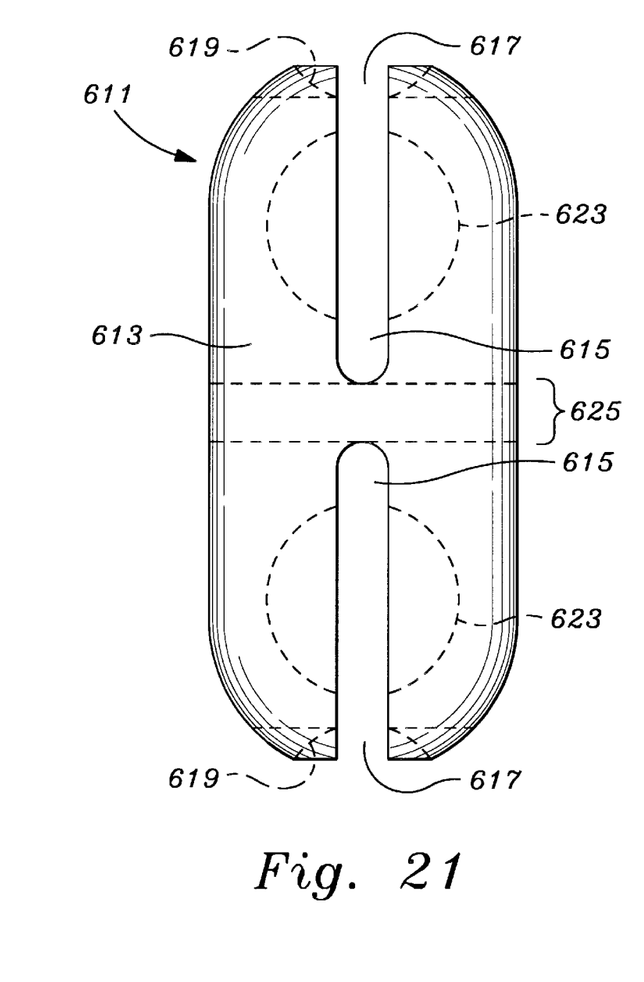
FIG. 21 is a side view of the embodiment shown in FIGS. 19 & 20.

FIG. 21 is a side view of the sixth embodiment of the re-attachable safety connector 611 of the present invention which illustrates the capsular body 613 with two slotted openings 615 which are in the same plane; FIG. 24 illustrates in dashed line format the position of the ball chambers 623 adjacent the end openings 617 as well as the inwardly angled surfaces 619 of each of the end sections of the capsular body 613. Note that like the fourth and fifth embodiments of the re-attachable safety connector 411 and 511 of FIGS. 19 and 21, the sixth embodiment of the re-attachable safety connector 611 has a middle portion 623 which may be varied in thickness in order to adjust the amount of tension needed to remove a pull chain ball (not illustrated) from the ball chamber 623.

One technique which can be applied to all of the connectors of the invention is the use of dimensioning such that one side holds slightly more force and pressure than the other side to prevent the connector from becoming simultaneously detached to leave a small object which could be swallowed by a child. For example, where one side of a connector 211, 311, 411, 511, or 611 is set to release at 10 pounds of force, the other side could be set to release at 10.5 pounds of force to insure that one side will give way before the other.

Referring back to FIGS. 3, 9, 13, 16, & 19, an arrow is shown on each of the connectors. The arrow indicates to the user which end should be connected to be in the upward direction, that end having preferably the stronger or greater magnitude of the two release pressures. When a child applies pressure to the chain, the bottom portion, below the connector 211, 311, 411, 511, or 611 will give way, leaving the connector 211, 311, 411, 511, or 611 attached to the upper segment of the chain. In this way, the child does not have the connector available to chew on and possibly dislodge as a separate structure to be swallowed.

One way to achieve this differential pressure could be by differing the width of the slotted openings 415, 515, and 615, of the connectors 411, 511, or 611. For example, the upper slot width, in the direction of the arrow, can be set to about 1.2 millimeters, while the lower slot width, in a direction opposite to the direction of the arrow, to about 1.5 millimeters. The wider width translates into a lesser amount of holding material and makes the bottom slightly weaker than the top.

In addition, the width of the slotted openings 415, 515, and 615 can be smaller, say 1.5 millimeters and 1.2 millimeters at the ends, respectively, and 1.76 millimeters between the center of the of the connectors 411, and 511, and the ball chambers 419, 519.

The present invention may be used in any setting in which a re-attachable safety connector for connecting segments of pull chain is needed. Multiple alterations to all embodiments of this invention are certainly possible with regard to dimensions of each and all elements and openings; variations are also possible with regard to composition of the components. Modifications to all parts of the invention may occur to those skilled in the art, and those modifications may be produced without departing from the spirit and scope of the invention. Therefore, included within the patent warranted hereon are all such changes and modifications as may reasonably and properly be included within the scope of this contribution to the art.

What is claimed:

1. A releasable safety connector comprising:
a first component and a second component, each having a first planar surface and a second surface oppositely disposed with respect to said first planar surface, and having a middle portion, a first curved end portion extending from said middle portion in a first direction, and a second curved end portion extending from said middle portion in a second direction opposite said first direction, said middle portion of said first component fixed with respect to said middle portion of said second component, said first and second components oriented such that said first curved end portion of said first component is disposed toward one of said first and said second curved end portions of said second component, to form a holding enclosure for a ball of a ball chain and set to release said ball at a low magnitude tension;

a pin extending through and joining both said middle portion of said first component and said middle portion of said second component, and wherein said pin extends through a center of both said middle portions of said first and second components to limit movement of said first and second components to a scissors action, and wherein said pin is a center pin and further comprising a shear pin extending through said middle portions of said first and second components to oppose movement of said first and second components about said center pin.

2. The connector as recited in claim 1 and further comprising a first shear plate carried by said middle portion of said first component and a second shear plate carried by said middle portion of said second component, said first shear plate opposing said second shear plate;

said shear pin extending through said middle portion of said first component, said middle portion of said second component and said first and said second shear plates, said first and second shear plates for localizing the shearing force between said first and second components.

3. A releasable safety connector comprising:

a first component and a second component, each having a first planar surface and a second surface oppositely disposed with respect to said first planar surface, and having a middle portion, a first curved end portion extending from said middle portion in a first direction, and a second curved end portion extending from said middle portion in a second direction opposite said first direction, said middle portion of said first component fixed with respect to said middle portion of said second component, said first and second components oriented such that said first curved end portion of said first component is disposed toward one of said first and said second curved end portions of said second component, to form a holding enclosure for a ball of a ball chain and set to release said ball at a low magnitude tension;

a first shear plate carried by said middle portion of said first component and a second shear plate carried by said middle portion of said second component, said first shear plate opposing said second shear plate; and a shear pin extending through said middle portion of said first component, said middle portion of said second component and said first and said second shear plates, said first and second shear plates for localizing the shearing force between said first and second components.

4. The connector as recited in claim 3 wherein said pin is a center pin and further comprising a side pin extending through said middle portions of said first and second components to oppose movement of said first and second components about said center pin.

* * * * *